United States Patent [19]

Walker et al.

[11] 4,444,668

[45] Apr. 24, 1984

[54] WELL COMPLETION FLUID COMPOSITIONS

[75] Inventors: Michael L. Walker, Duncan; Joe W. Johnson, Jr., Marlow, both of Okla.

[73] Assignee: Halliburton Company, Duncan, Okla.

[21] Appl. No.: 538,836

[22] Filed: Oct. 4, 1983

Related U.S. Application Data

[63] Continuation of Ser. No. 336,220, Dec. 31, 1981, abandoned.

[51] Int. Cl.³ .............................................. E21B 43/00
[52] U.S. Cl. .......................... 252/8.55 R; 166/244 C; 252/392; 252/389 R
[58] Field of Search ............ 252/8.5 A, 8.5 B, 8.55 R, 252/8.55 C, 147, 389.53; 422/12

[56] References Cited

U.S. PATENT DOCUMENTS

| | | | |
|---|---|---|---|
| 2,073,413 | 3/1937 | Cross et al. | 252/8.5 |
| 2,814,593 | 11/1957 | Beiswanger et al. | 252/8.55 |
| 3,107,221 | 10/1963 | Harrison et al. | 252/8.55 |
| 3,126,950 | 3/1964 | Carlberg et al. | 252/8.55 X |
| 3,404,094 | 10/1968 | Keeney | 252/148 |
| 3,773,465 | 11/1973 | Keeney et al. | 252/148 X |
| 4,292,183 | 10/1981 | Sanders | 252/8.55 |
| 4,304,677 | 12/1981 | Stauffer et al. | 252/8.55 |

FOREIGN PATENT DOCUMENTS

| | | |
|---|---|---|
| 823163 | 8/1956 | United Kingdom . |
| 826536 | 1/1958 | United Kingdom . |
| 847762 | 11/1958 | United Kingdom . |
| 1322548 | 10/1970 | United Kingdom . |

*Primary Examiner*—Herbert B. Guynn
*Attorney, Agent, or Firm*—Thomas R. Weaver; Edward F. Sherer

[57] ABSTRACT

A composition and method for well completion and workover. The composition comprises water, various halogen salts and an acetylenic alcohol. Optionally, other ingredients can be added to the composition. The method is carried out by contacting the well at sufficient hydrostatic pressure to control the well.

8 Claims, No Drawings

WELL COMPLETION FLUID COMPOSITIONS

This application is a continuation of application Ser. No. 336,220, filed Dec. 31, 1981 now abandoned.

This invention relates to well completion and workover fluid compositions and more particularly to a high density well completion and workover fluid composition that may be employed in petroleum recovery operations without excessive corrosion to ferrous metal tubing and pipe with which the composition may come into contact.

Current practice when completing wells, such as oil and gas wells, is to have drilling fluid, such as mud, salt water, water, or oil, in the well casing and to perforate the casing with a bullet shaped charge, or chemical or punchtype perforator. When the pressure of the formation traversed by the well exceeds the hydrostatic pressure of the column of oil or water at the completion depth, it is customary to use a composition with a density great enough to exceed the formation pressure in order to control the well while perforating the casing in performing other routine completion and workover operations. These compositions are prepared by dissolving certain inorganic salts in water.

These compositions, which have been employed during completion and workover operations, have certain undesirable consequences. For example, these compositions are usually somewhat corrosive and, therefore, cause corrosion to the ferrous metal conduits with which the composition comes in contact. This problem is particularly acute in petroleum recovery operations which require a high density composition as the increased concentration of salts in the fluid composition result in greater corrosion damage to the ferrous conduits.

For various reasons, it has become the practice in the petroleum industry to drill deeper wells and very often also to complete these wells at a plurality of zones. This, of course, has presented additional new unique problems in the art of completing and producing wells. Also, the closely related problems of workover on wells has been greatly magnified by the advent of and specifically in multiple completion wells which is at least in part due to prior completion factors. For example, after completing operations on an oil well to place it into production, a completion fluid again is employed to fill the annular space between the casing and the tubing above packers and left there throughout the life of the well or until reworking is required.

The purpose of using such annulus or filled-up fluids to fill the annulus space between tubing and casing above the packer after a well is completed and producing is to maintain a hydrostatic pressure at the top of the packer. A pressure desired at such points is one slightly greater than the highest pressure of all the producing formations. In this way, the hydrocarbons being produced exert only a slightly lesser pressure on the bottom side of the packer than the completion fluid exerts on the top side of the packer. Thus, by reducing the differential pressure between the top and bottom of the packer, the crude oil or other fluids exiting from the formation will not leak or bleed around the packer and/or control of the well will not be lost. The disadvantages and deleterious consequences of bleeding around packers by such fluids are well known to those skilled in the art. The consequences of losing control of the well are still better known. Similarly and especially with regard to multiple completion wells, the consequences of a completion fluid which is corrosive to ferrous metals is well known and appreciated by those skilled in the art.

In drilling deeper and deeper wells in search for petroleum producing formations, the temperatures encountered have increased to an extent that difficulties nonexistent theretofore have been encountered. Temperatures in the order of 200° to 250° F. or even higher may be encountered in oil and gas wells. At these temperatures, the completion fluids may form corrosive fluids which will damage ferrous metal tubing and pipe with which it may come into contact. It is, therefore, desirable to provide a well completion fluid which will be noncorrosive to ferrous metal conduits with which it may come in contact.

Temperature, as a rule, increases literally with depth. Many factors affecting temperature may vary in subterranean locations and the subterranean temperatures even in comparably close locations may vary considerably. The occurence of such and the reasons, therefore, are well known in the art. Thus, despite the general rule that the temperature increases with depth, comparably high temperatures are sometimes encountered at relatively shallow depths, for example, at 3,000 feet. At depths beginning at about 15,000 feet, high temperatures are encountered without exception regardless of location. High temperatures, then, may be encountered at a depth below 3,000 feet. These temperatures, when encountered regardless of depth, extenuate or accelerate the disadvantages of prior art completion and packer fluids.

In an effort to overcome the foregoing problems, high density salt solutions for use as well completion fluid compositions has been proposed. For instance, U.S. Pat. No. 3,126,950 discloses a completion packer fluid made up of a water solution of calcium chloride and zinc chloride and optionally a corrosion inhibitor. U.S. Pat. No. 4,292,183 discloses a high density fluid composition consisting of zinc bromide and calcium bromide in water having a density in the range of about 14.5 up to 18.0 pounds per gallon and a pH in the range of 3.5 up to 6.0.

These high density fluid compositions have had limited utility. Severe downhole corrosion problems and corrosion to above ground equipment has been encountered with their use.

The present invention provides a solution for, or at least mitigates the above described problem. The present invention provides a new well completion composition and a method for use of said composition. Thus, in accordance with the broad aspect of the concept of the invention, there is provided a composition for use as a well completion, packing and perforation medium comprising water; a salt selected from the group consisting of aluminum chloride, aluminum bromide, aluminum iodide, ammonium chloride, ammonium bromide, ammonium iodide, sodium chloride, sodium bromide, sodium iodide, potassium chloride, potassium bromide, potassium iodide, calcium chloride, calcium bromide, calcium iodide, zinc chloride, zinc bromide and zinc iodide and mixtures thereof; and, a compound selected from the group consisting of acetylenic alcohols having the general formula:

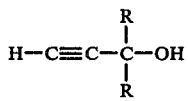

wherein R is H, alkyl, phenyl, substituted phenyl, or hydroxyalkyl radical wherein said composition has a density of about 9.0 pounds to about 21.5 pounds per gallon of composition. Optionally other ingredients may be added to the above described composition. For instance, an organic amine selected from the group consisting of mono, di and tri-alkyl amines having from about two to about six carbon atoms in each alkyl moiety, six membered N-heterocyclic amines, quinolines and quaternized derivatives of quinolines, quaternized pyridines, alkyl pyridines having from one to five nuclear alkyl substituents per pyridine moiety wherein said alkyl substituents have from one to 12 carbon atoms and mixtures thereof may be added.

When desired, an acid selected from the group consisting of formic acid, acetic acid, proprionic acid, butyric, glycolic acid and mixtures thereof may be added to the above described composition. The method of the invention comprises contacting the well at sufficient hydrostatic pressure with the composition of the invention.

When the above described method of completion of workover of wells is employed, the composition is relatively noncorrosive to the ferrous metal conduits with which it comes in contact.

The salts, which may be used in the practice of the present invention, function as weighting agents and increase corrosion inhibition. These salts are presented in the following Table.

TABLE I

| Salts Suitable as Weighting Agents | | |
|---|---|---|
| Name | Formula | Specific Gravity |
| Aluminum Bromide | AlBr$_3$ | 3.01 |
| Aluminum Chloride | AlCl$_3$ | 2.44 |
| Aluminum Iodide | AlI$_3$ | 3.98 |
| Ammonium Bromide | NH$_4$Br | 2.33 |
| Ammonium Chloride | NH$_4$Cl | 1.53 |
| Ammonium Iodide | NH$_4$I | 2.51 |
| Calcium Bromide | CaBr$_2$ | 3.35 |
| Calcium Chloride | CaCl$_2$ | 2.15 |
| Calcium Iodide | CaI$_2$ | 3.96 |
| Potassium Bromide | KBr | 2.75 |
| Potassium Chloride | KCl | 1.98 |
| Potassium Iodide | KI | 3.13 |
| Sodium Bromide | NaBr | 3.20 |
| Sodium Chloride | NaCl | 2.16 |
| Sodium Iodide | NaI | 3.67 |
| Zinc Bromide | ZnBr$_2$ | 2.56 |
| Zinc Chloride | ZnCl$_2$ | 2.91 |
| Zinc Iodide | ZnI$_2$ | 4.66 |

The preferred salts and combinations of salts for use in the present invention are sodium chloride, calcium chloride, calcium bromide and the following combinations of salts: sodium chloride and calcium chloride, calcium chloride and calcium bromide, calcium chloride and zinc chloride, calcium bromide and zinc bromide, calcium bromide, zinc bromide and zinc chloride, and zinc chloride and zinc bromide.

The most preferred salts and combinations of salts for use in the invention are calcium chloride, calcium chloride and calcium bromide, calcium bromide and zinc chloride, and calcium bromide and zinc bromide.

The amount of these salts used in the composition of the invention will be the amount necessary to achieve a composition having a density of about 9.0 pounds to about 21.5 pounds per gallon of composition.

The acetylenic alcohols which inhibit corrosion of ferrous metal and which may be employed in accordance with the present invention have the general formula:

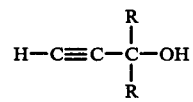

wherein R is H, alkyl, phenyl, substituted phenyl, or hydroxyalkyl radical. Examples of suitable acetylenic compounds include methylbutynol, ethyloctynol, methylpentynol, 3,4 dihydroxy 1-butyne, 1-ethynylcyclohexanol, 3-methyl-1-nonyn-3-ol, 2-methyl-3-butyn-2-ol, also 1-propyn-3-ol, 1-butyn-3-ol, 1-pentyn-3-ol, 1-heptyn-3-ol, 1-octyn-3-ol, 1-nonyl-3-ol, 1-decyn-3-ol, 3-(2,4,6-trimethyl-3-cyclohexenyl)-1-propyne-3-ol.

In many instances, the corrosion protection of the composition of the invention may be increased by adding an organic amine to the above described acetylenic alcohol. Amines that are suitable for this purpose include an organic amine selected from the group consisting of mono, di and trialkyl amines having from about two to about six carbon atoms in each alkyl moiety, six membered N-heterocyclic amines, quinolines and quaternized derivatives of quinolines, alkyl pyridines having from zero to six nuclear alkyl substituents per pyridine moiety wherein said alkyl substituents have from one to 12 carbon atoms and mixtures thereof. Examples of these amines include ethylamine, diethylamine, triethylamine, propylamine, dipropylamine, tripropylamine, mono, di, tributylamine, mono, di and tripentylamine, mono, di and trihexylamine and isomers of these such as isopropylamine, tertiarybutylamine, aniline, dehydroabiethylamine, pyridine, quaternized derivatives of pyridine, nitro picoline, methyl quinoline alkyl pyridines such as alkyl pyridines having from 1 to 5 nuclear alkyl substituents per pyridine moiety, quinolines, quaternized derivatives of quinolines alkyl quinolines and mixtures.

In some instances, it may be desirable to include an acid in the composition of the invention. The acid, when present in the composition of the invention will remove acid soluble scales in the well bore or open perforations in the well bore. When an acid is desired, suitable acids which may be employed include formic acid, glycolic acid, acetic acid, proprionic acid, butyric acid and mixtures thereof.

As stated earlier, the acetylenic alcohol may be used alone with the composition of the invention or an organic amine may be combined with an acetylenic alcohol. The relative proportions of acetylenic alcohol and organic amine may vary over a wide range. Furthermore, it has been found that the concentration of acetylenic alcohol and the concentration of the organic amine are not interdependent and thus significant improvement in corrosion protection can be obtained by varying the concentration of one of the components without varying that of the other. In general, the acetylenic alcohol concentration will vary from about 0.2 to about 5.0 percent by volume of the composition. However, lower or higher concentrations will still be effective when an organic amine is added to the composition of the invention. Thus, the amine concentration will vary over a wide range with really no upper or lower limitations. General, the organic amine concentration when desired will vary from about 0.05 to 3.0 volume percent of the composition of the invention.

A particularly effective blend containing an amine and acetylenic alcohol is set forth below.

| Blend I | |
|---|---|
| Chemical: | Percent by vol. |
| Pure propargyl alcohol | 33.94 |
| Crude propargyl alcohol | 11.31 |
| Ethyl octynol | 16.97 |
| High alkyl pyridines | 3.85 |
| Formaldehyde (55%) in methanol | 33.94 |

Another effective composition containing an amine and acetylenic alcohol is given below.

| Blend II | |
|---|---|
| Chemical: | Percent by vol. |
| Pure propargyl alcohol | 33.94 |
| Crude propargyl alcohol | 11.31 |
| Ethyl octynol | 16.97 |
| Alkyl pyridines | 3.85 |
| Diacetone alcohol | 33.94 |

Another effective blend containing an amine and acetylenic alcohol is given below. This blend is very effective when the density of the composition of the invention is from about 15.0 pounds per gallon to about 16.5 pounds per gallon and the salts utilized are calcium bromide and zinc chloride and when the density is from about 16.5 pounds per gallon to about 19.2 pounds per gallon and the salts utilized are calcium bromide and zinc bromide.

| Blend III | |
|---|---|
| Chemical: | Percent by vol. |
| Crude quaternized quinoline | 56.00 |
| Propargyl alcohol | 21.00 |
| Ethyl Octynol | 13.00 |
| 15 moles of ethylene oxide adduct of nonyl phenol | 10.00 |
| $Cu_2I_2$ | 0.024 grams per milliter of composition |

The preferred density of the composition of the invention is from about 16.5 to about 21.5 pounds per gallon of composition.

The concentration of the acid, when employed in the composition of the invention will vary over a great range. Generally the range of acid is from 0.2 percent to about 40 volume percent of the composition. The most preferred acid concentration is from about 3 to about 17 volume percent of the composition.

The following examples will serve to more comprehensively illustrate the principles of the invention but in being directed to certain specific compounds in process steps and conditions are not intended to limit the bounds of the invention.

EXAMPLE I

In order to compare the corrosion inhibiting ability of the composition of the invention, various samples containing 10 percent by volume of formic acid or acetic acid were prepared with various amounts of calcium chloride. Tests 1 through 5 contained Blend I as an inhibitor. Blend I, as disclosed earlier, contains the following ingredients: pure propargyl alcohol, crude propargyl alcohol, ethyl octynol, high alkyl pyridines and formaldehyde (55%) in methanol.

Tests 6 through 10 contained, as an inhibitor, Blend III. Blend III was made up of crude quaternized quinoline, propargyl alcohol, ethyl octynol, and 15 moles of ethylene oxide adduct of nonyl phenol and $Cu_2I_2$.

A coupon of API Type N-80 steel was placed in the acid composition for a period of eight hours at 200° F. All tests were carried out under atmospheric conditions.

The loss of weight in pounds per square foot was calculated as follows:

$$\text{Corrosion Loss lbs/ft}^2 = \frac{144 \frac{\text{in}^2}{\text{ft}^2}}{455 \frac{g}{l} \times \text{Surface Area of Coupon in}^2}$$

Results of these tests are shown in Table II.

TABLE II

Volume - Surface Area Ratio - 25 cc./in.$^2$

| | | | Corrosion Loss lbs/ft$^2$ | |
|---|---|---|---|---|
| Test | Inhibitor | CaCl$_2$ | Formic Acid | Acetic Acid |
| 1 | Blend I | — | 0.287 | 0.296 |
| 2 | Blend I | 9.5 lbs/gal | 0.052 | 0.029 |
| 3 | Blend I | 10.0 lbs/gal | 0.023 | 0.025 |
| 4 | Blend I | 10.5 lbs/gal | 0.005 | 0.005 |
| 5 | Blend I | 11.0 lbs/gal | 0.005 | 0.004 |
| 6 | Blend III | — | 0.029 | 0.019 |
| 7 | Blend III | 9.5 lbs/gal | 0.009 | 0.013 |
| 8 | Blend III | 10.0 lbs/gal | 0.003 | 0.009 |
| 9 | Blend III | 10.5 lbs/gal | 0.003 | 0.002 |
| 10 | Blend III | 11.0 lbs/gal | 0.002 | 0.002 |

Table II shows that the composition of the invention effectively reduced iron corrosion.

EXAMPLE II

In order to demonstrate the corrosion inhibiting ability of the composition of the invention, various samples of a 10 percent by volume acetic acid were prepared with various salts. The density of the samples was ten pounds per gallon of sample. Tests 4 through 6 and 8 contained Blend I as an inhibitor. The composition of this Blend is the same as disclosed in Example I. Tests 1 through 3 and 7 utilized MBA 29 as an inhibitor. MBA 29 contained, as ingredients, 50 percent by volume crude quaternized quinoline and 50 percent by volume methyl butynol.

A coupon of API Type N-80 steel was placed in the acidic composition for a period of six hours at 200° F. All tests were carried out under atmospheric conditions. The corrosion loss was calculated as in Example I.

The results of these tests are shown in Table III.

TABLE III

Volume - Surface Area Ratio - 25 cc./in.$^2$

| Test | Salt | Inhibitor 1% v/v | Corrosion Loss lbs/ft$^2$ |
|---|---|---|---|
| 1 | AlCl$_3$ | MBA29 | 0.004 |
| 2 | NaBr | MBA29 | 0.004 |
| 3 | NH$_4$I | MBA29 | 0.003 |
| 4 | AlCl$_3$ | Blend I | 0.009 |
| 5 | NaBr | Blend I | 0.018 |
| 6 | NH$_4$I | Blend I | 0.005 |
| 7 | — | MBA29 | 0.150 |

TABLE III-continued

| | | Volume - Surface Area Ratio - 25 cc./in.$^2$ | |
|---|---|---|---|
| Test | Salt | Inhibitor 1% v/v | Corrosion Loss lbs/ft$^2$ |
| 8 | — | Blend I | 0.287 |

Table III shows that the composition of the invention reduced iron corrosion.

EXAMPLE III

In order to compare the corrosion inhibiting ability of the composition of the invention, a composition which had a density of 19.2 pounds per gallon was prepared. The salt utilized in preparing the composition was a mixture of zinc bromide and calcium bromide. A coupon of API Type N-80 steel was placed in the composition for a period of seven days at 260° F. All tests were carried out under atmospheric conditions.

Blend III was made up of the same components as described in Example I. Blend II was made up of pure propargyl alcohol, crude propargyl alcohol, ethyl octynol, alkyl pyridines and diacetone alcohol.

Test 9 could not be accurately calculated due to contamination of the sample during the test.

Results of these tests are shown in Table IV.

TABLE IV

| | Volume - Surface Area Ratio 25 cc./in.$^2$ | |
|---|---|---|
| Test | Inhibitor 1% v/v | Corrosion Loss lbs/ft$^2$ |
| 1 | — | 0.102 |
| 2 | Propargyl alcohol | 0.058 |
| 3 | Methyl butynol | 0.019 |
| 4 | Methyl pentynol | 0.056 |
| 5 | 50 percent by volume hexynol | 0.026 |
| 6 | Ethyloctynol and 10 percent by volume of 15 moles of ethylene oxide adduct of nonyl phenol | 0.098 |
| 7 | 50 percent by volume propargyl alcohol & 50 percent by volume quaternary quinoline | 0.013 |
| 8 | 50 percent by volume methyl butynol & 50 percent by volume quaternary quinoline | 0.011 |
| 9 | 50 percent by volume methyl pentynol & 50 percent by volume quaternary quinoline | 0.105 |
| 10 | 50 percent by volume propargyl alcohol & 50 percent by volume pyridine | 0.044 |
| 11 | mixture of acetylenic alcohol, cyclic amine and linear amines | 0.052 |
| 12 | mixture of acetylenic alcohol, cyclic amine and linear amines | 0.050 |
| 13 | mixture of acetylenic alcohol, cyclic amine and linear amines | 0.048 |
| 14 | mixture of acetylenic alcohol, cyclic amine and linear amines | 0.048 |
| 15 | Blend II | 0.005 |
| 16 | Blend III | 0.007 |

Table IV shows that the composition of the invention effectively reduced iron corrosion.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

What is claimed is:

1. A method of completing a well penetrating a subterranean formation comprising:
   contacting said well at sufficient hydrostatic pressure to control the well with a composition having a density in the range of from about 9.0 pounds to about 21.5 pounds per gallon of composition and comprising:
   (a) water;
   (b) a salt selected from the group consisting of aluminum chloride, aluminum bromide, aluminum iodide, ammonium chloride, ammonium bromide, ammonium iodide, sodium chloride, sodium bromide, sodium iodide, potassium chloride, potassium bromide, potassium idodide, calcium chloride, calcium bromide, calcium iodide, zinc chloride, zinc bromide, zinc iodide and mixtures thereof;
   (c) An inhibitor comprising:
      I. a mixture comprising:
         (1) about 56 percent by volume crude quaternized quinoline;
         (2) about 21 percent by volume propargyl alcohol;
         (3) about 1300 percent by volume ethyl octynol;
         (4) about 10 percent by volume of an ingredient comprising 15 moles of ethylene oxide adduct of nonyl phenol; and,
      II. about 0.024 grams of $Cu_2I_2$ per milliter of said mixture.

2. The method recited in claim 1 wherein said method is carried out at a temperature of at least 200° F.

3. The method recited in claim 1 wherein said composition further comprises an acid selected from the group consisting of formic acid, acetic acid, glycolic acid, proprionic acid, butyric acid and mixtures thereof and said acid is present in said composition in the range of from about 0.2 to about 40 volume percent of said composition.

4. The method recited in claim 3 wherein said acid is acetic acid.

5. The method recited in claim 1 wherein the density of the composition is from about 16.5 to about 19.2 pounds per gallon of composition.

6. The method recited in claim 5 wherein said salt is calcium bromide and zinc bromide.

7. The method recited in claim 1 wherein the density of the composition is from about 15.0 pounds per gallon to about 16.5 pounds per gallon of composition.

8. The method recited in claim 7 wherein the salt is calcium bromide and zinc chloride.

* * * * *

UNITED STATES PATENT AND TRADEMARK OFFICE
CERTIFICATE OF CORRECTION

PATENT NO. : 4,444,668
DATED : April 24,1984
INVENTOR(S) : Walker, et al.

It is certified that error appears in the above-identified patent and that said Letters Patent is hereby corrected as shown below:

In column 1, line 17 delete the word [punchtype] and insert therefor --punch-type--.
In column 1, line 38 after the word "deeper" insert the words --and deeper--.
In column 8, line 31 delete [1300] and insert therefor --13.00--.

Signed and Sealed this

Twelfth Day of February 1985

[SEAL]

Attest:

DONALD J. QUIGG

Attesting Officer  Acting Commissioner of Patents and Trademarks